US012631324B2

(12) United States Patent
Steinfels et al.

(10) Patent No.: US 12,631,324 B2
(45) Date of Patent: May 19, 2026

(54) ADDITIVE AND INTEGRATED LIGHTING AND CAMERA ACCESSORIES FOR A HYDRAULIC JACK

(71) Applicant: Harbor Freight Tools USA, Inc., Calabasas, CA (US)

(72) Inventors: Craig Steinfels, Powell, OH (US); Andrew McGraw, Newbury Park, CA (US); Casper Wypych, Calabasas, CA (US); Michael Matteo, Los Angeles, CA (US)

(73) Assignee: Harbor Freight Tools USA, Inc., Calabasas, CA (US)

( * ) Notice: Subject to any disclaimer, the term of this patent is extended or adjusted under 35 U.S.C. 154(b) by 0 days.

(21) Appl. No.: 18/981,326

(22) Filed: Dec. 13, 2024

(65) Prior Publication Data

US 2025/0198613 A1 Jun. 19, 2025

Related U.S. Application Data

(60) Provisional application No. 63/610,015, filed on Dec. 14, 2023.

(51) Int. Cl.

| | |
|---|---|
| ***F21V 33/00*** | (2006.01) |
| ***F21L 4/08*** | (2006.01) |
| ***F21V 23/04*** | (2006.01) |
| *F21Y 115/10* | (2016.01) |

(52) U.S. Cl.

CPC ............ *F21V 33/0084* (2013.01); *F21L 4/08* (2013.01); *F21V 23/04* (2013.01); *F21Y 2115/10* (2016.08)

(58) Field of Classification Search

CPC .... F21V 33/0084; F21V 23/04; F21V 33/008; F21V 33/00; F21L 4/08; F21L 4/00; F21Y 2115/10

See application file for complete search history.

(56) References Cited

U.S. PATENT DOCUMENTS

| | | | | |
|---|---|---|---|---|
| 4,640,495 A * | 2/1987 | Parsons | B66F 5/04 | 254/8 B |
| 6,357,724 B1 * | 3/2002 | Hung | B66F 5/00 | 254/93 H |
| 7,309,140 B2 * | 12/2007 | Huang | B66F 3/25 | 362/486 |
| 7,588,341 B2 * | 9/2009 | Lin | A47G 19/2227 | 254/45 |

(Continued)

OTHER PUBLICATIONS

Tank Tough 3 Ton Floor Jack TT2023-1, <https://www.oreillyauto.com/detail/c/tank-tough/tools---equipment/professional-equipment/lifting/hydraulic-floor-jacks/e7a827c9c135/tank-tough-3-ton-floor-jack/tnk0/tt20231>.

(Continued)

*Primary Examiner* — Bao Q Truong

(74) *Attorney, Agent, or Firm* — McAndrews Held & Malloy, Ltd.

(57) ABSTRACT

A lighting system for a floor jack is disclosed. The lighting system includes at least one lighting element operable to emit a light beam. The lighting system is operable to illuminate a vehicle's lifting points so that the lifting operation of a vehicle may be performed safely. The light beam of the lighting system is adjustable and is operable to emit light at a plurality of angles. The lighting system further includes a camera operable to transmit video images to an electronic device.

16 Claims, 12 Drawing Sheets

(56) References Cited

U.S. PATENT DOCUMENTS

| | | | | |
|---|---|---|---|---|
| 2003/0043581 A1* | 3/2003 | Finnigan | F21V 33/00 | 362/427 |
| 2009/0296380 A1* | 12/2009 | Shen | F21V 33/008 | 254/11 |
| 2012/0228838 A1* | 9/2012 | Chapman | B66F 11/048 | 254/130 |

OTHER PUBLICATIONS

Thorsen Low-Profile Jack with LED Light and Sockets—2.5 Ton, Model# 29-130, <https://www.northerntool.com/products/thorsen-low-profile-jack-with-led-light-and-sockets-2-5-ton-model-29-130-26131>.

Liftmaster Low Profile Trolley Jack With LED Light 2.5 Ton <https://www.indiamart.com/proddetail/low-profile-trolley-jack-with-led-light-2-5-ton-bbsp9992bc-21931810512.html>.

Blackhawk S4 with light lead <https://www.garagejournal.com/forum/threads/blackhawk-s4-with-light-lead.233819/>.

Vintage Floor Jacks; Posted by 141drew Dec. 21, 2011 at 11:04 AM and filed under Reviews & Features <https://www.garagejournal.com/vintage-floor-jacks/>.

* cited by examiner

ADDITIVE AND INTEGRATED LIGHTING AND CAMERA ACCESSORIES FOR A HYDRAULIC JACK

CROSS-REFERENCE TO RELATED APPLICATIONS

This application claims priority to U.S. Provisional Application No. 63/610,015, filed Dec. 14, 2023, the entire contents of which are incorporated by reference herein.

BACKGROUND

The present disclosure relates generally to additive and integrated lighting and camera accessories for hydraulic jacks, and specifically floor jacks.

Traditional floor jacks typically include a saddle positioned on a mounting bracket of a lifting arm. The saddle is positioned below a suitable lifting point on a vehicle, and the lifting arm is actuated to lift the vehicle to a given height. Such floor jacks are often used to lift vehicles to suspend the tires/wheels of the vehicle and/or provide access (when used in conjunction with jack stands) to the underbody of the vehicle.

It is imperative that a floor jack is positioned properly beneath the lifting points of a vehicle to ensure that any lifting operation is performed safely. To properly position a floor jack beneath the vehicle's lifting points, an operator must be able to find and identify those lifting points. Unfortunately however, even in a well-lit garage, where some ambient light reaches the underside of the vehicle, the large shadow cast by the body of the vehicle may nonetheless hide or obstruct those lifting points of the vehicle. An operator using a traditional floor jack may therefore, be unable to properly identify the vehicle's lifting points. It is therefore advantageous for a floor jack to include integrated or removable lighting or camera accessories to assist in properly positioning the floor jack and illuminating the underbody of the vehicle.

SUMMARY

A lighting system for a floor jack is disclosed, as illustrated by and described in connection with the figures of the present disclosure, and as set forth in the claims.

Specifically, disclosed is an example lighting system for a floor jack. The lighting system includes at least one lighting element operable to emit a light beam. The lighting system further includes a battery electrically coupled to the lighting element and operable to power the lighting element. The lighting system further includes a switch electrically coupled to the battery and operable between a first position and a second position. In this example the light beam is adjustable.

In one example, the lighting element is coupled to a lifting arm of the floor jack. In another example, the lighting element includes a housing associated with the lifting arm, wherein the housing includes a lens and at least one light-emitting diode (LED) light within the housing. In another example, the lighting element projects the light beam towards at least an end of the lifting arm.

In another example, the lighting element is removable, wherein the lighting element may be coupled to the floor jack at a plurality of locations. In another example, the lighting system includes at least one camera element and a communication circuit. In this example, the camera element is operable to record at least one video image and the communication circuit is operable to transmit the video images to an electronic device.

Also disclosed is a floor jack. The vehicle jack includes a body and a lift arm pivotably coupled to the body. The vehicle jack further includes at least one lighting element operable to emit a light beam towards a portion of the floor jack. The vehicle jack further includes a battery electrically coupled to the lighting element operable to power the lighting element. The vehicle jack further includes a switch electrically coupled to the battery and operable between a first option and a second position. In this example, the light beam is adjustable.

In one example, the at least one lighting element includes a housing coupled to a portion of the floor jack, wherein the housing includes a lens and least one light-emitting diode (LED) light within the housing. In another example, the at least one lighting element includes a first lighting element coupled to the floor jack at a first location and a second lighting element coupled to the floor jack at a second location, wherein the first location is different than the second location.

In another example, the first lighting element is coupled to the body proximate a front axle. In another example, the first lighting element is coupled to the lifting arm. In another example, the first lighting element is coupled to a saddle jack, wherein the saddle jack is pivotably coupled to the lifting arm.

In another example, the first lighting element is coupled to a support element coupled to the body. In another example, the support element is pivotable to adjust the light beam. In another example, a first light beam of the first lighting element overlaps with a second light beam of the second lighting element. In another example, the first lighting element and the second lighting element are affixed on opposite positions on a circumference of a jack saddle, wherein the jack saddle is pivotably coupled to the lift arm. In another example, the vehicle jack includes a bridge couple to the body operable to move between an upper extended position and a lower retracted position, wherein the lighting element is coupled to the bridge.

Also disclosed is an example floor jack. The floor jack includes a body and a lifting arm pivotally coupled to the body operable to move between a raised configuration and a lowered position. The floor jack further includes at least one lighting element coupled to a portion of the floor jack and operable to emit a light beam towards an end of the lifting arm. The floor jack further includes a battery electrically coupled to the lighting element operable to power the lighting element. The floor jack further includes a switch electrically coupled to the battery and operable between a first position and a second position. In this example, the light beam is adjustable.

In one example, the lighting element includes a housing integrated with the lifting arm, the housing operable to receive at least one light-emitting diode (LED) light. In another example, the floor jack further includes at least one camera element integrated with the lighting element and a communication circuit. In this example, the camera element is operable to record video images and the communication circuit is operable to transmit the video images to a mobile electronic device.

Figure 1:
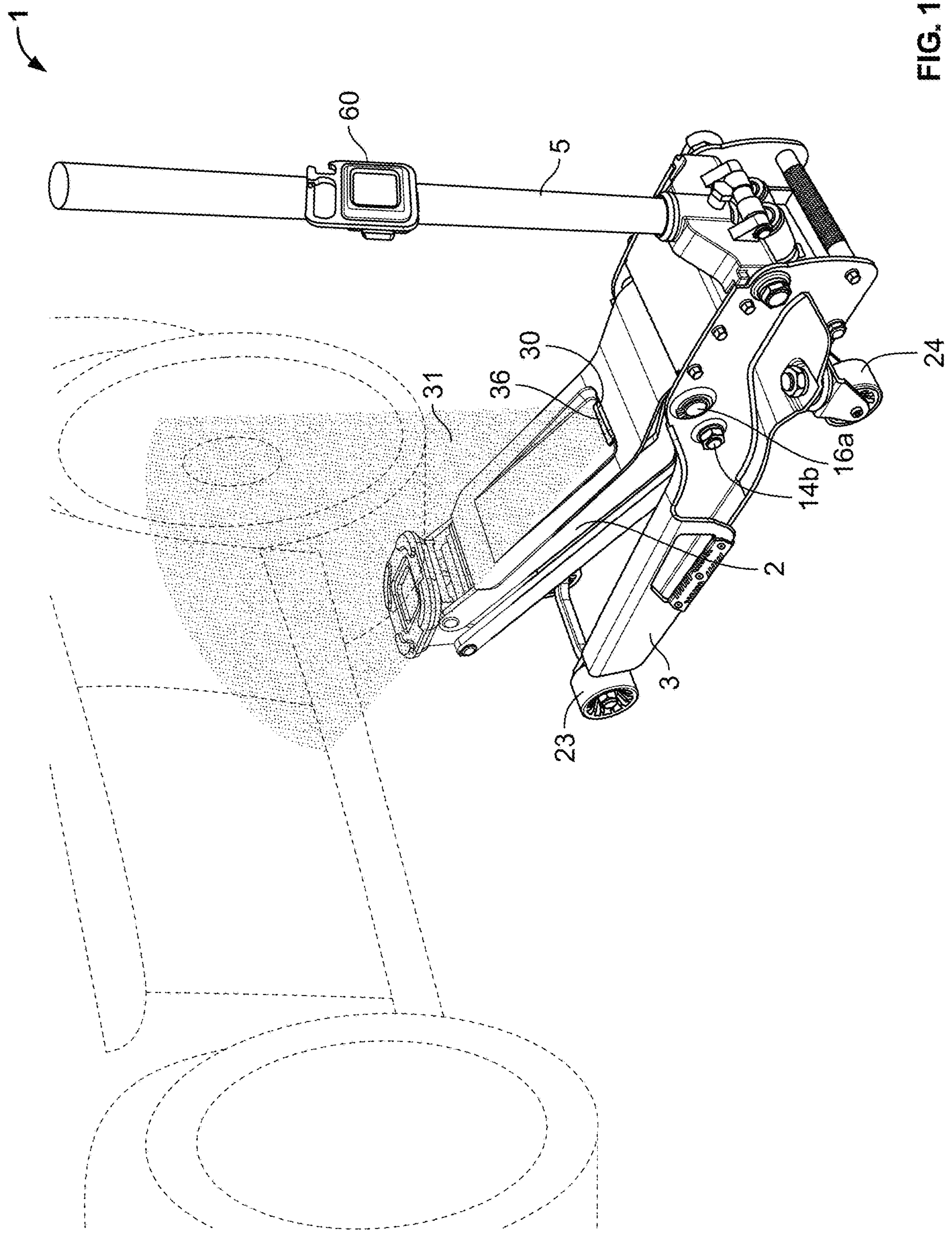
FIG. 1 illustrates a perspective view of a floor jack including a lighting element coupled to a lifting arm, which is positioned in a raised position, according to one aspect of the present disclosure.

The foregoing summary, as well as the following detailed description of certain features of the present application, are better understood when read in conjunction with the appended drawings. For the purposes of illustration, certain features are shown in the drawings. It should be understood, however, that the disclosure are not limited to the arrangements shown in the attached drawings. Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of applications comprising one or more embodiments of the disclosure. As such, the drawings are not meant to include all conventional features known by those of ordinary skill in the art to be required for the practice of the embodiments disclosed herein.

DETAILED DESCRIPTION

FIG. 1 shows an exemplary embodiment of a floor jack 1 including a lighting element 30 coupled to a lifting arm 2. The lighting element 30 is operable to emit a light beam 31 onto a work area or vehicle. The light beam 31 may be adjustable based on positioning of the light beam 31 relative to the floor jack 1, the brightness level of the light being emitted from the lighting element 30, and/or the amount of lighting elements 30 coupled to the floor jack 1 selectively being operated during periods of use. The floor jack 1 includes a body 3 and the lifting arm 2 pivotally connected to the body 3 at a second link pivot **14*b* and a lower lifting arm pivot 16*a*. It is to be understood the lighting elements 30 discussed herein associated with floor jacks 1 may also be coupled to and/or integrated with other types of jacks and/or lifting devices, such as bottle jacks, ratchet jacks, scissor jacks, etc. The present disclosure also contemplates multiple lighting elements coupled to floor jack 1, such as, for example, lighting element 60 coupled to handle 5 as shown in FIG. 1**.

Figure 2:
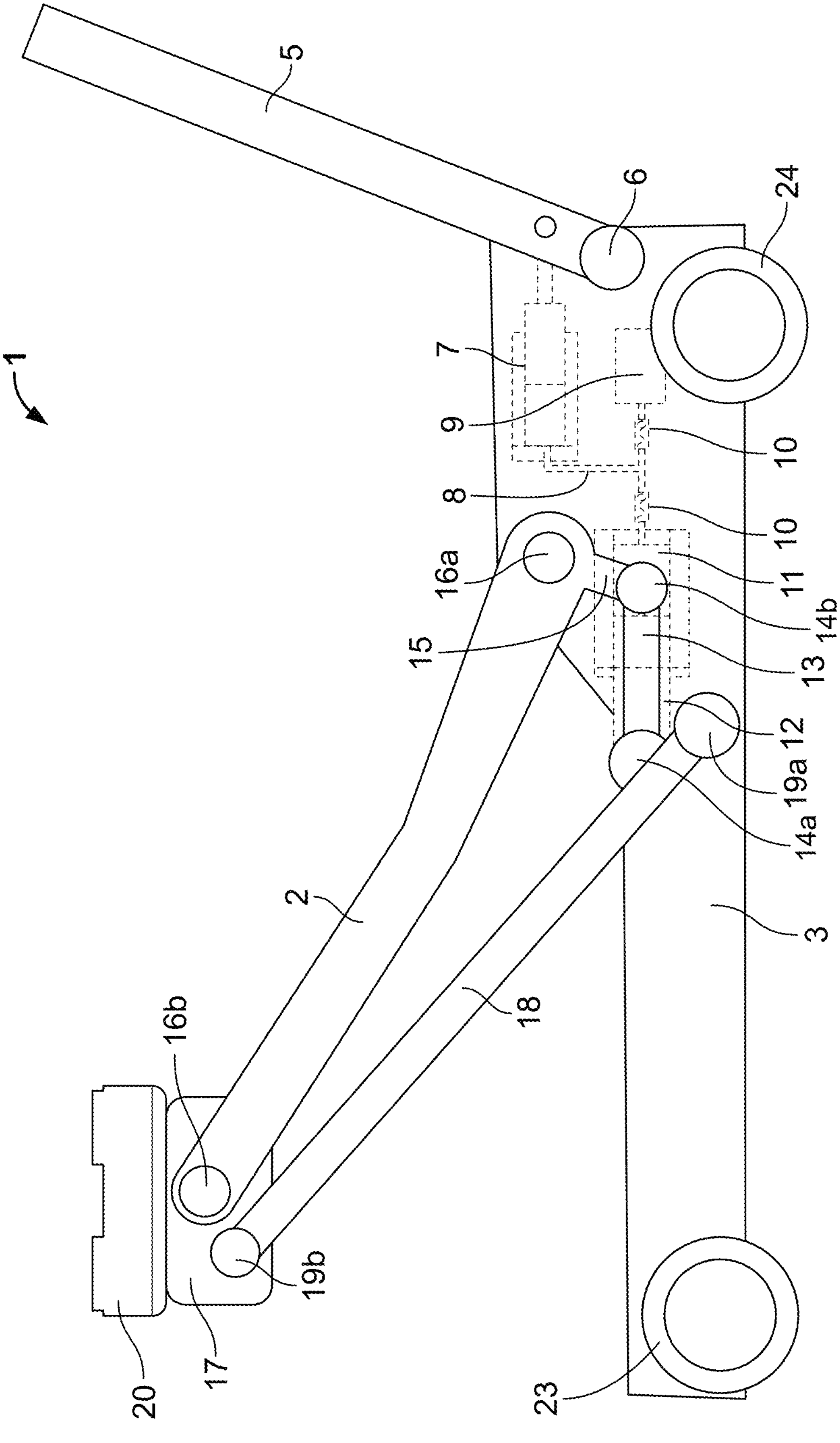
FIG. 2 illustrates a partial cut-away view of the floor jack, showing a lifting arm in a raised configuration and exemplary internal components of the floor jack.

FIG. 2 shows a partial cutaway view of the floor jack 1 in a raised configuration. As illustrated, the handle 5 is operable to raise the lifting arm 2 by repeatedly pumping handle 5 up and down (i.e., rotating the handle 5 about the handle pivot 6) to actuate at least one jack cylinder 7. Such pumping of the jack cylinder 7 builds up pressure of hydraulic fluid, which is transferred via a fluid conduit 8 from a low pressure reservoir 9 through one or more check valve(s) 10, into one or more fluid reservoirs 11. As pressure builds and more hydraulic fluid is transferred into the fluid reservoir 11, a ram 12 is driven outward, away from the handle 5. As shown, ram 12 is pivotably coupled to at least one link 13 via first link pivot **14*a*. Link 13 is pivotably coupled to at least one rocker arm 15 via the second link pivot 14*b*. Rocker arm 15 is fixed to, or integral with, the lifting arm 2. The lifting arm 2 pivotably couples to and pivots about the lower lifting arm pivot 16*a*. As the ram 12 is driven outward, ram 12 acts on (i.e., pulls) link 13, which in turn causes the rocker arm 15 and lifting arm 2 to rotate about the lower lifting arm pivot 16*a*. In the illustrated embodiment, lifting arm 2 is coupled to the mounting bracket 17 via an upper lifting arm pivot 16*b*. A lever 18, which in some embodiments may be a radius arm, is pinned between the body 3 of the floor jack 1 and the mounting bracket 17 and assists in preventing rotation of the mounting bracket 17. As shown, one end of the lever 18 is connected to the body 3 of the floor jack 1 via a first lever pivot 19*a* and the other end of the lever 18 is connected to the mounting bracket 17 via a second lever pivot 19*b*. As the lifting arm 2 is raised, lever 18 rotates about the first lever pivot 19*a* and the second lever pivot 19*b*, providing support for any load applied to a saddle jack 20 and the mounting bracket 17. The ram 12 retracts and the lifting arm 2 is lowered when pressure is released from the fluid reservoir 11**.

Figure 3:
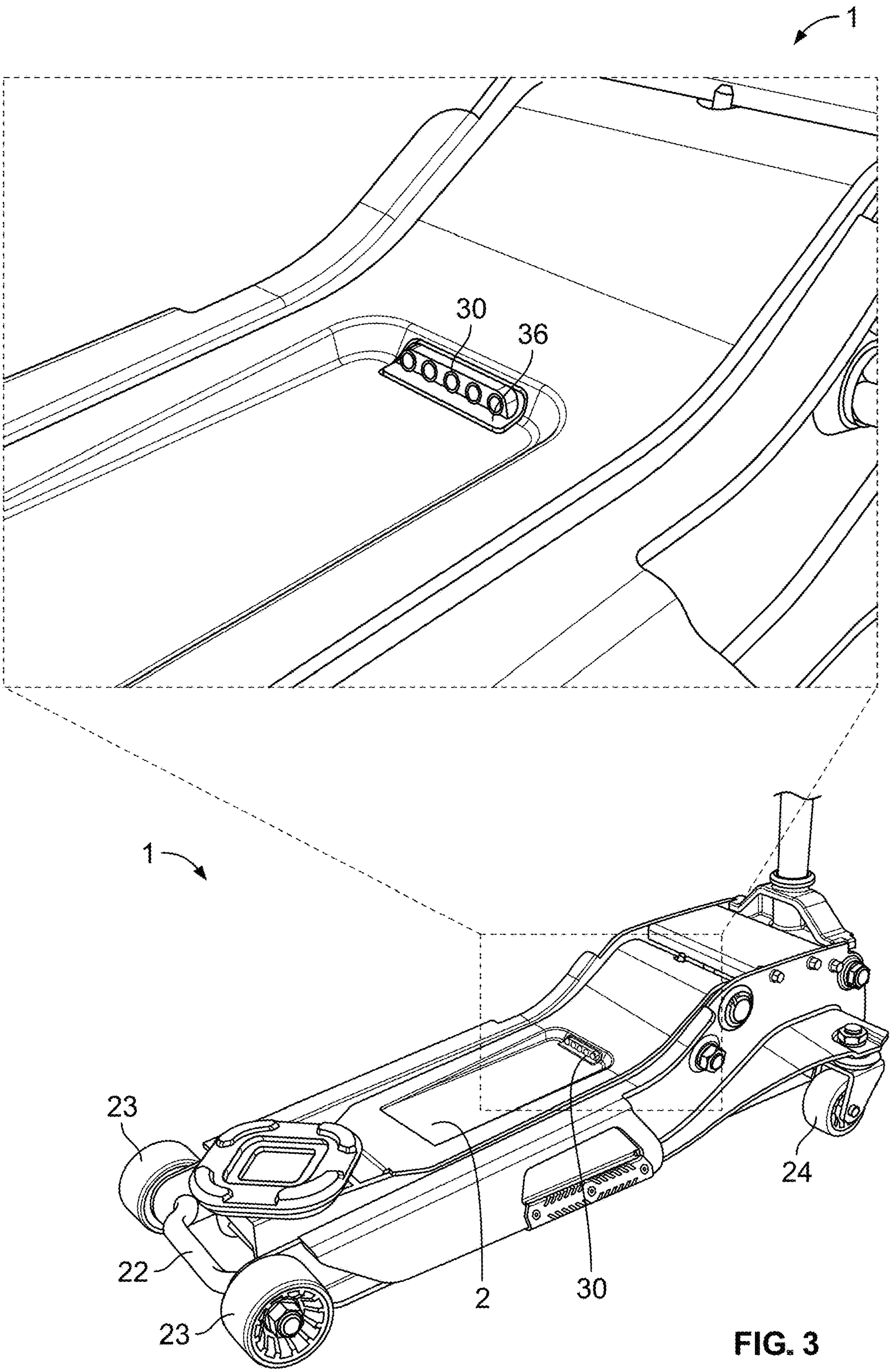
FIG. 3 illustrates a partial detail perspective view of the floor jack of FIG. 1, depicting in detail the lighting element coupled to the lifting arm, according to one aspect of the present disclosure.

As shown in FIGS. 1-3, the floor jack 1 includes front wheels 23 and rear wheels 24. In the illustrated embodiment, the front wheels 23 are mounted onto an axle 22 (see FIG. 3) and the rear wheels 24 are caster wheels. In alternative embodiments the front wheels 23 and the rear wheels 24 may be mounted to corresponding front and rear axles. In some embodiments, the floor jack 1 includes caterpillar tracks or tank treads. In other embodiments, the floor jack 1 includes tracks or treads and front wheels 23 or rear wheels 24.

As is shown in FIGS. 1 and 3, a lighting element 30 is integrated with the lifting arm 2. In alternative embodiments, the lighting element 30 may be coupled to or attached to the lifting arm 2. For example, the lighting element 30 may be removable from the lifting arm 2 in order to service or maintain the lighting element 30. More specifically, the lifting arm 2 may include a housing 36 or receptacle (not shown) configured to receive the lighting element 30 and the lighting element 30 may be removed by a user. The user may remove the lighting element 30 by actuating a switch, such as a push-button, or manually pulling the lighting element 30 out of the receptacle or the housing 36.

Referring to FIG. 3, the lighting element 30 may include one or a plurality of LEDs electrically coupled to a battery, not shown, also disposed within the lifting arm 2. It is understood that the present disclosure contemplates all types of LEDs, including, but not limited to, dual in-line package, surface mounted diode, and chip on board, suitable for illuminating a work area. The use of LEDs over alternative lighting means is advantageous due to LEDs low power consumption. Consequently, a smaller (and more cost effective) battery may be used while still providing sufficient battery life to be commercially desirable. The lighting element 30 may also be equipped with an on/off switch or button, a timer, or a shut-off after a period of inactivity. The lighting element 30 may also be equipped with an inertial measurement unit or accelerometer that may cause the lighting element 30 to turn on based on either interaction by a user, such as tapping motion on a specific area, or turn on based on movement of the floor jack 1. In one embodiment, the lighting element 30 may be voice activated. In alternative embodiments, the floor jack 1 may include a motion sensor in which detected motion near the floor jack 1 may activate the lighting element 30.

In one embodiment, the battery consists of a battery compartment and removable disposable battery cells (e.g., AAA or AA batteries). In another embodiment, the battery is an integrated rechargeable lithium-ion battery and includes circuitry and a charging port (e.g., a micro-USB or USB-C port) for recharging the battery. The charging port is operable to receive a charging cable coupled to a power source for transferring electrical current via the circuitry to charge the rechargeable lithium-ion battery. The battery may also be recharged by solar, inductive methods of charging, or by using generator elements mechanically attached to moving parts of the floor jack 1.

Figure 4:
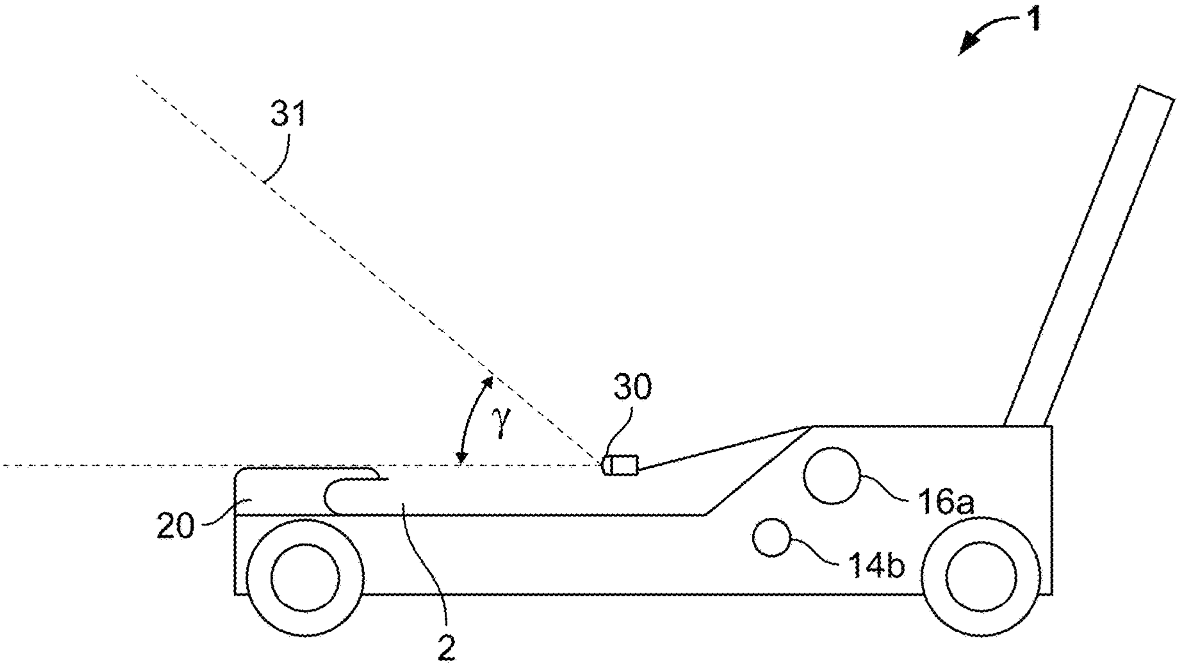
FIG. 4 illustrates a side elevation view of the floor jack of FIG. 1, depicting the lifting arm in a lowered position and illustrating a light beam of the lighting element, according to one aspect of the present disclosure.
Figure 5:
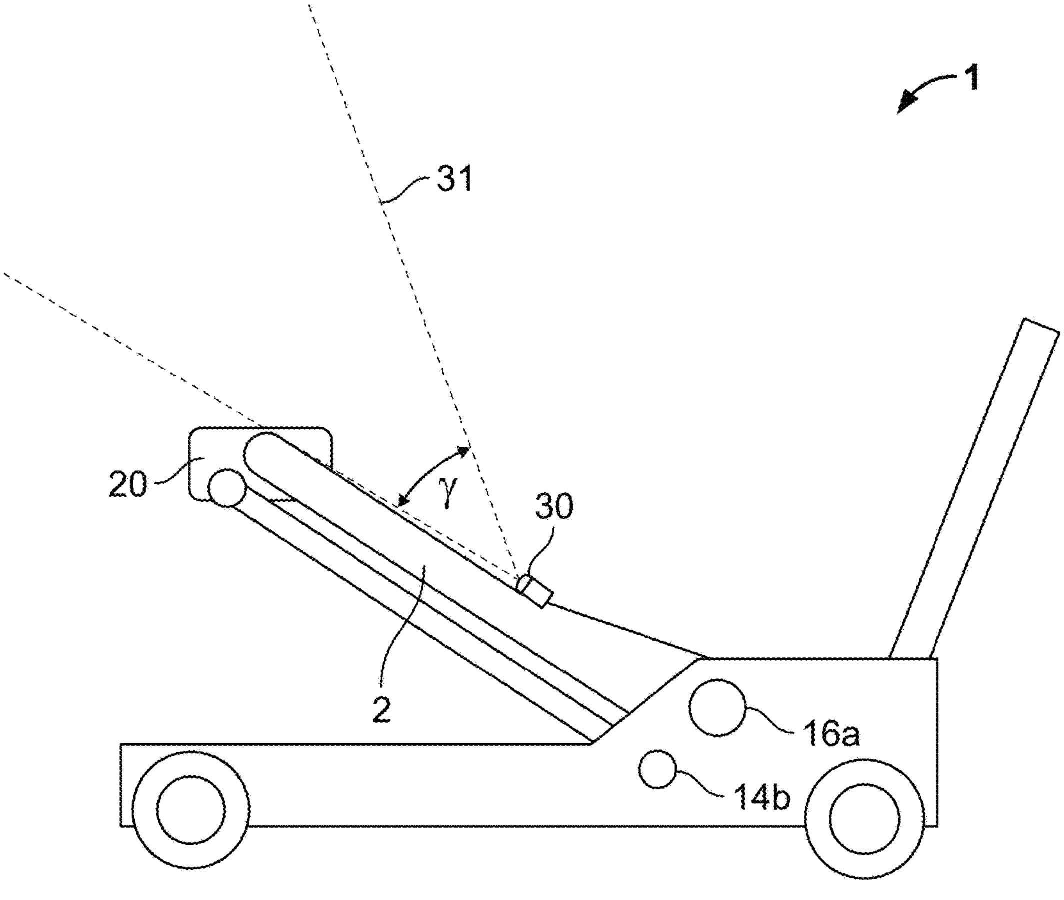
FIG. 5 illustrates a side elevation view of the floor jack of FIG. 1, depicting the lifting arm in the raised position and illustrating the light beam of the lighting element, according to one aspect of the present disclosure.

FIGS. 4 and 5 show the light beam 31 of the lighting element 30 integrated into the lifting arm 2. One or more lenses may be used to project the light created by the LED(s) into the light beam 31. Wider beam angles output a reduced light intensity for the light beam 31 but illuminate a wider area. By contrast, narrower beam angles output higher intensity for the same light beam 31. The light element 30 is positioned proximate the second link pivot 14*b* and the lower lifting arm pivot 16*a* of the lifting arm 2 and angled to illuminate the saddle jack 20. By positioning the lighting element 30 proximate the second link pivot 14*b* and the lower lifting arm pivot 16*a*, a beam angle γ of the light beam 31 is cast wide enough to illuminate the jack saddle 20 and surrounding areas. Further, because the lighting element 30 is integrated and coupled to the lifting arm 2, the light beam 31 will shift depending on the positioning of the lifting arm 2. For example, as shown in FIG. 4, when the lifting arm 2 is in a lowered position, the light beam 31 is directed primarily forward, towards the jack saddle 20, and slightly upward. The light beam 31 may be optimal to illuminate the underbody of the vehicle and/or suitable lifting points of the vehicle when the lifting arm 2 is in the lowered position. Further, as shown in FIG. 5, for example, as the lifting arm 2 is raised, the light beam 31 is continuously illuminating the saddle jack 20 and the light beam 31 is directed further upwards in the vertical direction. The light beam 31 may be suitable for illuminating work areas (e.g., wheel well, etc.) when the lifting arm 2 is in the raised configuration. In the illustrated embodiment in FIGS. 4 and 5, the direction of the light beam 31 is adjustable such that it may correlate to the positioning of the lifting arm 2.

In alternative embodiments, the light beam 31 of the lighting element 30 may be adjustable by physically repositioning the position of the lighting element 30 with respect to the lifting arm 2. In such an embodiment, the light beam 31 of the lighting element 30 is not being emitted at a constant angle relative to the lifting arm 2. Rather, the lighting element 30 is operable to emit the light beam 31 at a plurality of angles regardless of the position of the lifting arm 2 between the lowered position and the raised configuration. For example, a hinge and linkage coupled to the lighting element 30 on the lifting arm 2 could be used to adjust the light beam 31 between the plurality of angles. In such an example, the user may adjust the angle of the light beam 31 and maintain constant illumination on a target area while the lifting arm 2 is traveling in an upward or downward direction. In other embodiments, the lighting element 30 may be coupled to a housing or bracket that swivels, thereby allowing the user to adjust the light beam 31 at the plurality of angles.

For example, when the lifting arm 2 is in the lowered position, the lighting element 30 on the lifting arm 2 may emit the light beam 31 at the target area under the vehicle. Subsequently, as the lifting arm 2 moves towards the raised configuration, the lighting element 30 automatically or manually, adjusts to tilt downwards or upwards relative to the moving lifting arm 2 in order to keep the target work area illuminated. Additionally, the lighting element 30 may be adjustable by the user in order to illuminate a fixed point, such as the desired work area. Depending on the light beam 31, the lighting element 30 in the lifting arm 2 may have an aim point that is not optimized when the lifting arm 2 is traveling in an upward or downward direction.

Figure 6:
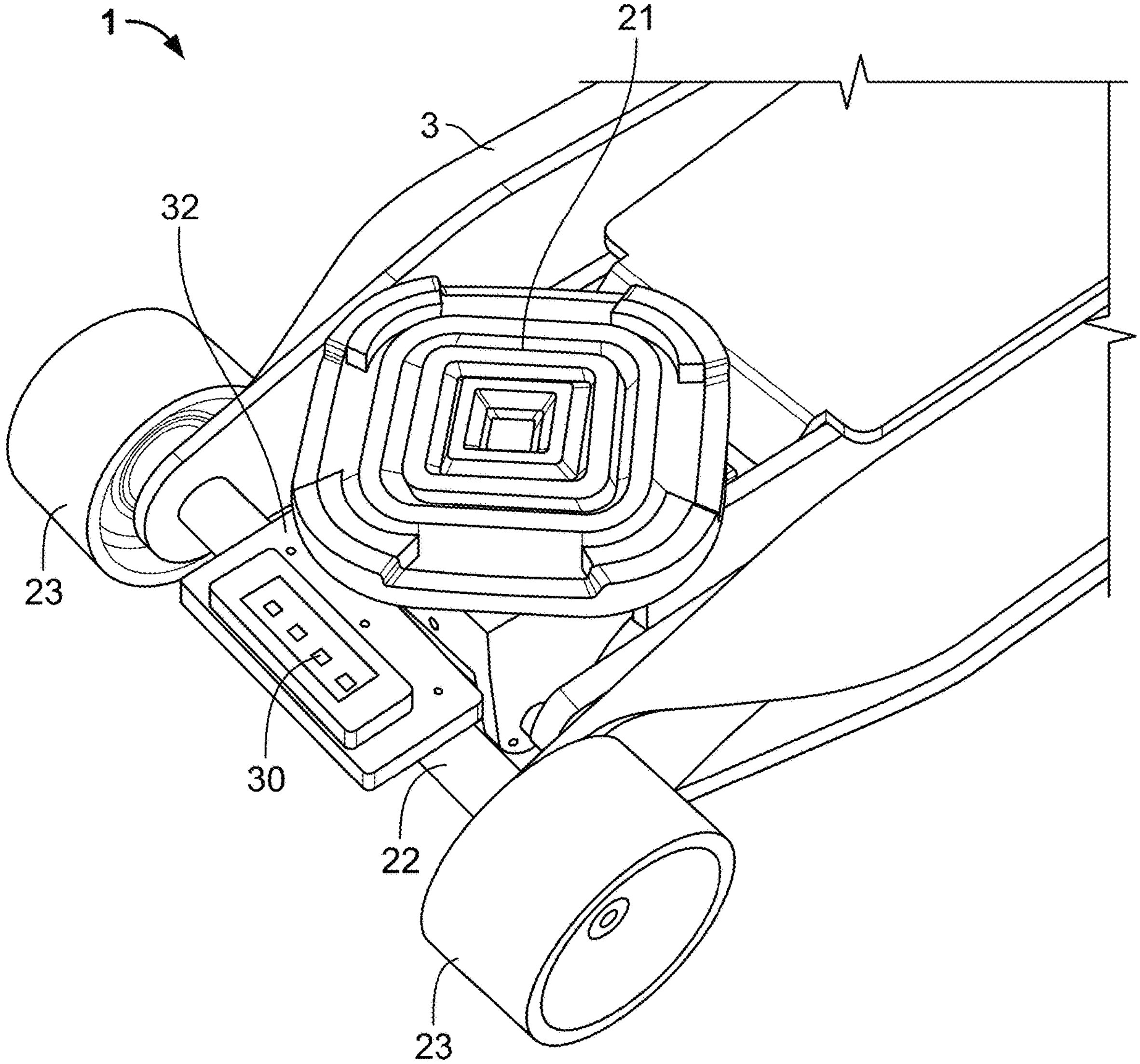
FIG. 6 illustrates a partial detail perspective view of a floor jack including a lighting element coupled to a support element, positioned above a front axle between a pair of front wheels, according to one aspect of the present disclosure.

FIG. 6 illustrates an alternative embodiment including the lighting element 30 positioned adjacent the front axle 22 of the floor jack 1. In the illustrated embodiment, the lighting element 30 is mounted on a support element 32. The support element 32 may be coupled to the body 3 of the floor jack 1 proximate and above the axle 22 between the front wheels 23. The support element 32 may be removable from the body 3 to permit the user to maintain the lighting element 30 by providing access to replace the batteries or replace the lighting element 30. The support element 32 may also be pivotal relative to the body 3 permitting the user to adjust the lighting element 30 to illuminate the desired work area. The support element 32 may be manually adjusted by the user physically moving the support element 32 or the support element 32 may be remotely electrically adjusted by the use of a remote control. The lighting element 30 may likewise be one or more LEDs and function as described above with respect the embodiment(s) shown in FIGS. 1 and 3. It is understood that the illustrated embodiment of FIG. 6 is exemplary and that the lighting element 30 may be coupled to any part of the floor jack 1 by using the support element 32. The support element 32 may be a bracket or another type of fastening device capable of coupling the lighting element 30 to portions of the floor jack 1. For example, the lighting element 30 may be coupled to a side of the floor jack 1 using the support element 32. Additionally, the support element may include a pivoting feature enabling the user to manually or electronically, aim the lighting element 30 at the target work area (e.g., a lift point). One advantage of such an embodiment is that the direction of the light beam 31 of the lighting element 30 can be maintained and/or adjusted independent of the lifting arm 2 position. Another advantage is that the support element 32 may be coupled above the front axle 22 between the front wheels 23 to allow for the beam angle to be wider to illuminate the work area or underbody of the vehicle. In alternative embodiments, the support element 32 may be coupled to the jack saddle 20 or another portion of the floor jack 1 to illuminate the desired work area for the user.

Figure 7:
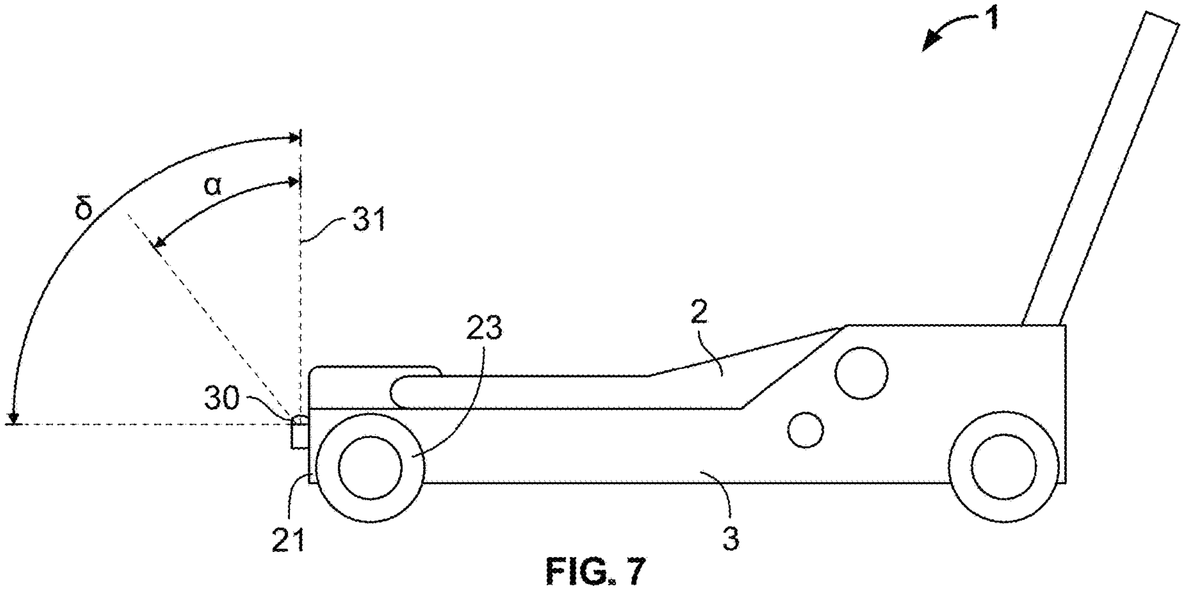
FIG. 7 illustrates a side elevation view of the floor jack of FIG. 6, depicting the lifting arm in the lowered position and illustrating the light beam of the lighting element, according to one aspect of the present disclosure.

Referring to FIG. 7, the light beam 31 of the lighting element 30 mounting generally above the front axle (not shown) between the front wheels 23 of the floor jack 1 is shown. The light beam 31 does not move in response to movement of the lifting arm 2. The light beam 31 is stationary relative to movement of the lifting arm 2. The light beam 31 constantly illuminates substantially upwards, illuminating the work area and/or vehicle located above the floor jack 1. Additionally, the lighting element 30 may be mounted to or coupled to the front axle and positioned to emit the light beam 31 in a substantially horizontal direction and parallel with the body 3 of the floor jack 1. The lighting element 30 can be adjusted to a wider range of beam angles either manually or electronically. In alternative embodiments, the lighting element 30 located above the front axle 22 between the front wheels 23 may be electronically or manually adjusted by the user. The user may adjust the lighting element 30 to emit the light beam(s) 31 at specified target work areas to provide the user with a better illuminated work area.

Figure 8:
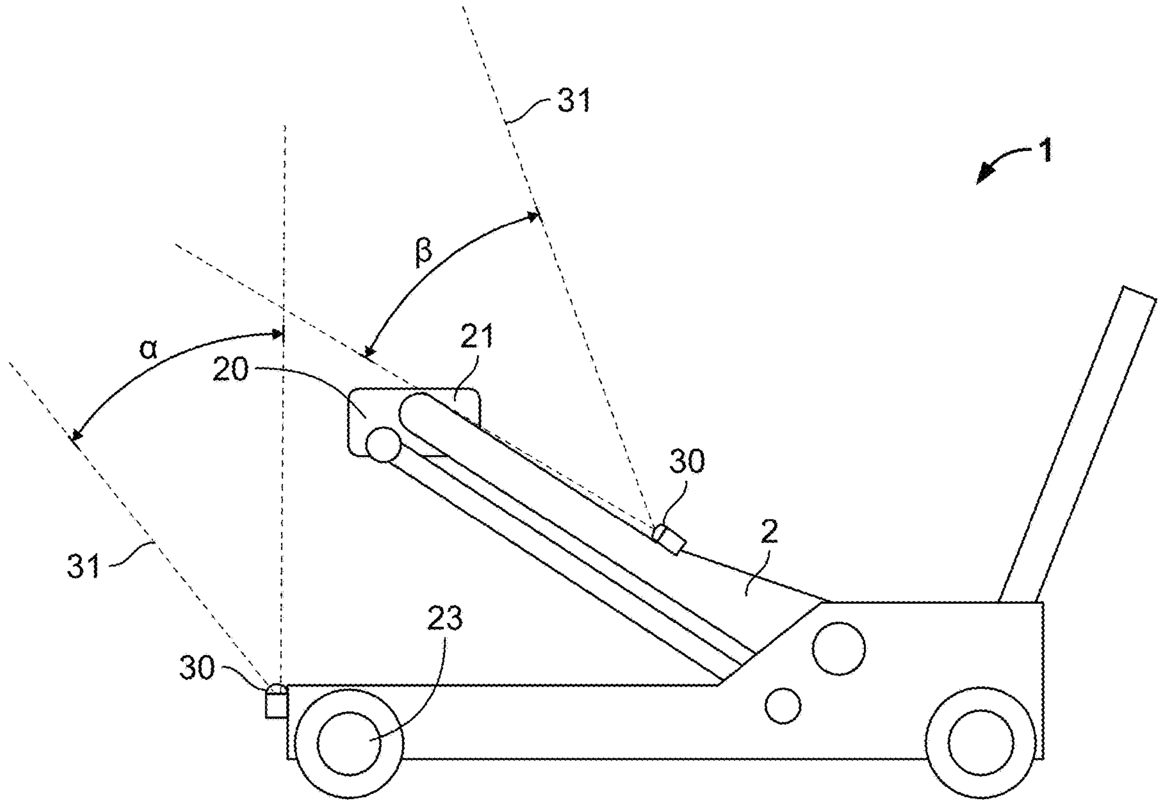
FIG. 8 illustrates a side elevation view of the floor jack of FIG. 6, depicting the lifting arm in a raised position including a secondary lighting element and illustrating the light beams of the lighting elements, according to one aspect of the present disclosure.

FIGS. 7 and 8 show beam angles α and β of the lighting elements 30 when the lifting arm 2 is in the raised configuration. The beam angle α and the beam angle β may be approximately 45°. The present disclosure contemplates that the beam angles themselves may be adjustable, ranging from at least about 0° to at least about 180°. The present disclosure also contemplates that the direction of the beam angles may be adjustable, ranging from at least about 0° to at least about 180°. For example, as shown in FIG. 7, beam angle α may illuminate continuously at 45° approximately, and may be adjusted to a larger beam angle, such as beam angle δ at approximately 90°. The beam angles discussed in this paragraph may be larger or smaller in alternative embodiments. It is understood, that the adjustable beam angles discussed in this paragraph could be incorporated into any of the other embodiments included in this disclosure.

FIG. 8 shows an exemplary embodiment combining the front axle 22 lighting element 30 with the lifting arm 2 lighting element 30. In such embodiment the corresponding light beams 31 may overlap, providing optimal lighting to the surrounding work area. For example, the front axle 22 lighting element 30 illuminates the underbody and lifting points of the vehicle (not shown) and the lifting arm 2 lighting element 30 illuminates the jack saddle 20 and surrounding area. The combination of the two lighting elements 30 may provide ideal illumination for the user to find the lifting point of the vehicle, properly position the jack saddle 20, and safely raise the vehicle. In alternative embodiments, more integrated or coupled lighting elements 30 may be associated with the floor jack 1. The user having the option of using all of the lighting elements 30 during a period of operation or selecting which lighting elements 30 to use dependent upon the need of the user and targeted work area.

Figure 9:
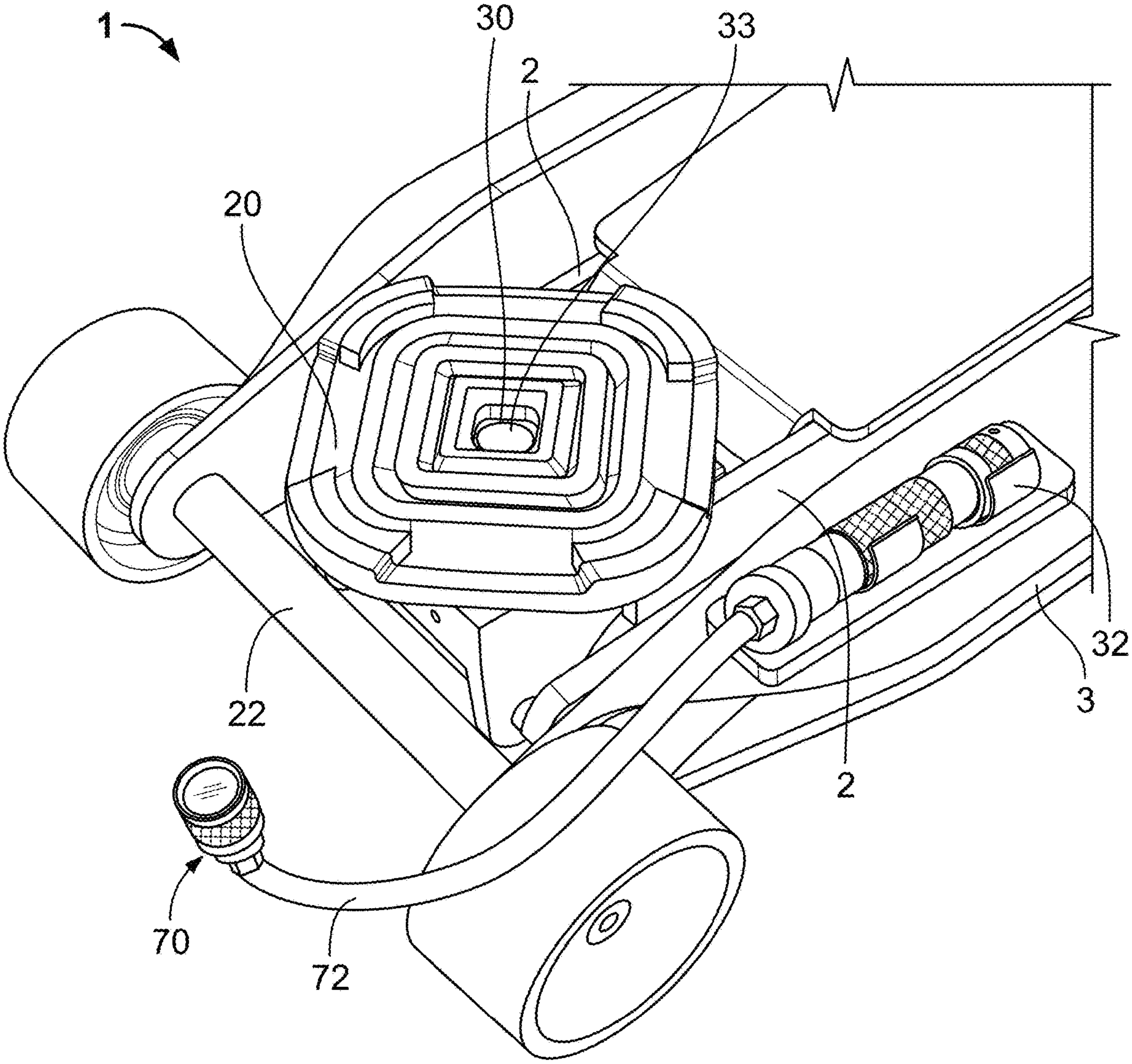
FIG. 9 illustrates a partial detail perspective view of a floor jack including an integrated lighting element and a camera element disposed in the center of a jack saddle, according to one aspect of the present disclosure.

FIG. 9 depicts an alternative embodiment including a combination lighting element 30 and camera element 33 integrated and disposed in the center of the jack saddle 20. The lighting element 30 may likewise be one or more LEDs and function as described in the embodiments above. The lighting element 30 is positioned to provide sufficient lighting for the camera 33. The camera 33 is coupled to communication circuitry, which is operable to transmit video images captured by the camera 33 to a portable electronic device (e.g., smart phone, tablet or computer, etc.). The communication circuitry may communicate with the portable electronic device via any suitable frequencies (e.g., Bluetooth or Wi-Fi). It is understood that the present embodiment may optionally be combined with any of the front lighting elements 30 associated with the front axle 22 or the lifting arm as described above. In alternative embodiments, the lighting element 30 may located in the center of the jack saddle 20 without the camera 33. Furthermore, the camera 33 may be located on the floor jack 1 in other locations, such as on the front axle 22, lifting arm 2, handle 5 (not shown), jack body 3, or any other location on the floor jack 1. The camera 33 may be a gooseneck camera. The camera 33 may be integrated into the floor jack 1, or it may be removable from the floor jack 1. Additionally, the camera 33 may be mountable to various locations on the floor jack 1, by use of a clamp or some other type of fastening device in which to couple the camera 33 to the floor jack 1. Lastly, the user may be able to change the position of the camera 33 electronically or manually, whether it be integrated with the floor jack 1 or removable with the floor jack 1. As discussed in more detail below, FIG. 9 also shows flexible lighting element 70 coupled to floor jack 1 via support element 32.

Figure 10:
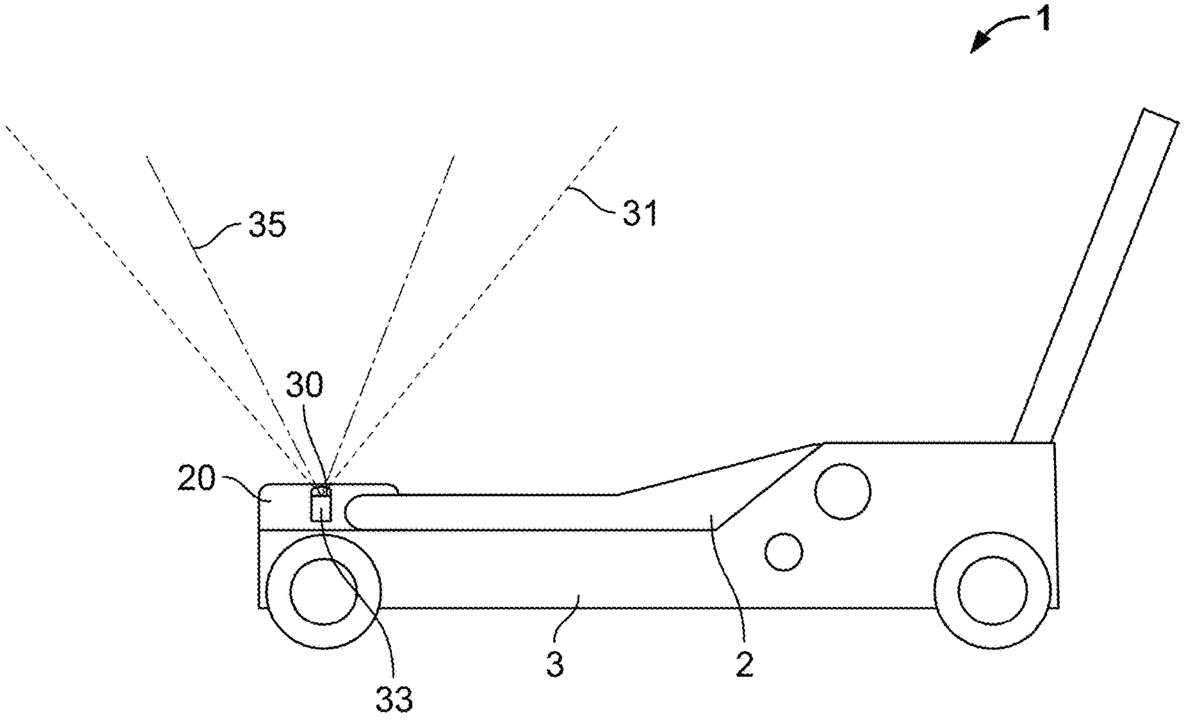
FIG. 10 illustrates a side elevation view of the floor jack of FIG. 9, depicting the lifting arm in the lowered position and illustrating the light beam of the lighting element and field of view of the camera, according to one aspect of the present disclosure.

FIG. 10 shows exemplary light beam 31 of the lighting element 30 and a camera field of view 35 of the camera element 33 where the combination lighting element 30 and camera element 33 is integrated in the jack saddle 20. In such an embodiment, the lighting element 30 is configured to cast the light beam 31 upwardly at an angle suitable for illuminating the underbody of the vehicle. The camera 33 is positioned such that the field of view 35 is directed upwards. The present embodiment allows the user to view the illuminated underbody of the vehicle without the need to bend down and position their head underneath the vehicle. For example, when the video from the camera 33 is transmitted to the portable electronic device, the user can find and position the jack saddle 20 precisely underneath the lifting point prior to engaging with and lifting the vehicle. In alternative embodiments, the combination lighting element 30 and camera element 33 may be located in various other locations on the floor jack 1, such as the front axle (not shown), the lifting arm 2, the jack body 3, etc.

Figure 11:
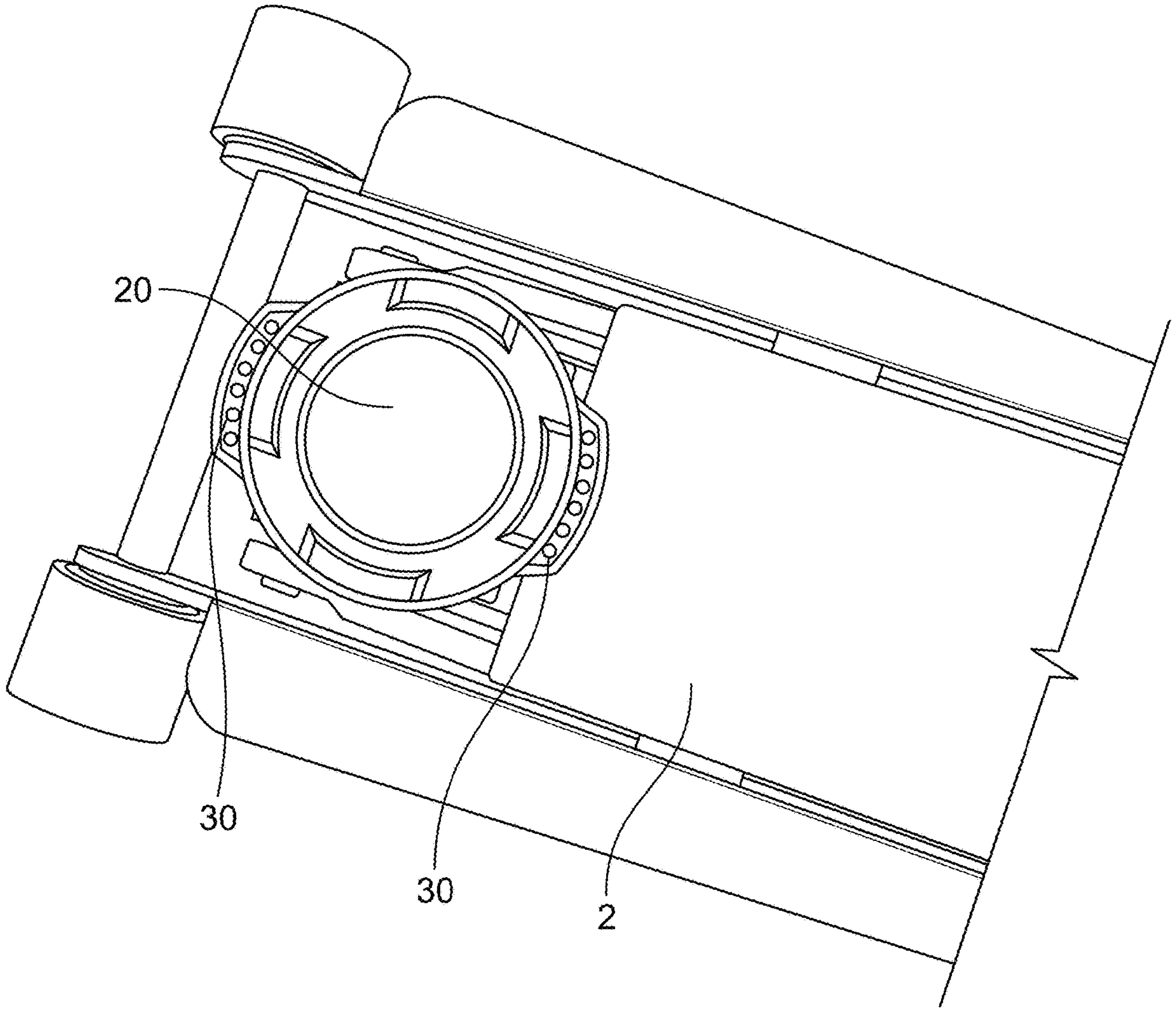
FIG. 11 illustrates a partial detail perspective view of a floor jack including two lighting elements coupled to two opposing sides of the jack saddle, according to one aspect of the present disclosure.

FIG. 11 shows an alternative embodiment of a dual lighting element 30 mounted to the periphery of the jack saddle 20. The dual lighting element 30 may likewise be one or more LEDs and function as described in the embodiments above. It is understood that the dual lighting embodiment may optionally be combined with any of the lighting elements 30 and camera 33 embodiments described above. Additionally, the dual lighting element 30 includes a first light housing 37 and a second light housing 38. During periods of use, the user may select to emit light from both the first light housing 37 and the second light housing 38, only the first light housing 37, or only the second light housing 38. Selecting the use of the dual lighting element 30 may be completed by the user remotely or by pressing a button or switch located on the floor jack 1 (not shown). Additionally, in alternative embodiments, the dual lighting element 30 may be rotated about the outer periphery of the jack saddle 20 to provide the user the ability to illuminate the desired work area.

Figure 12:
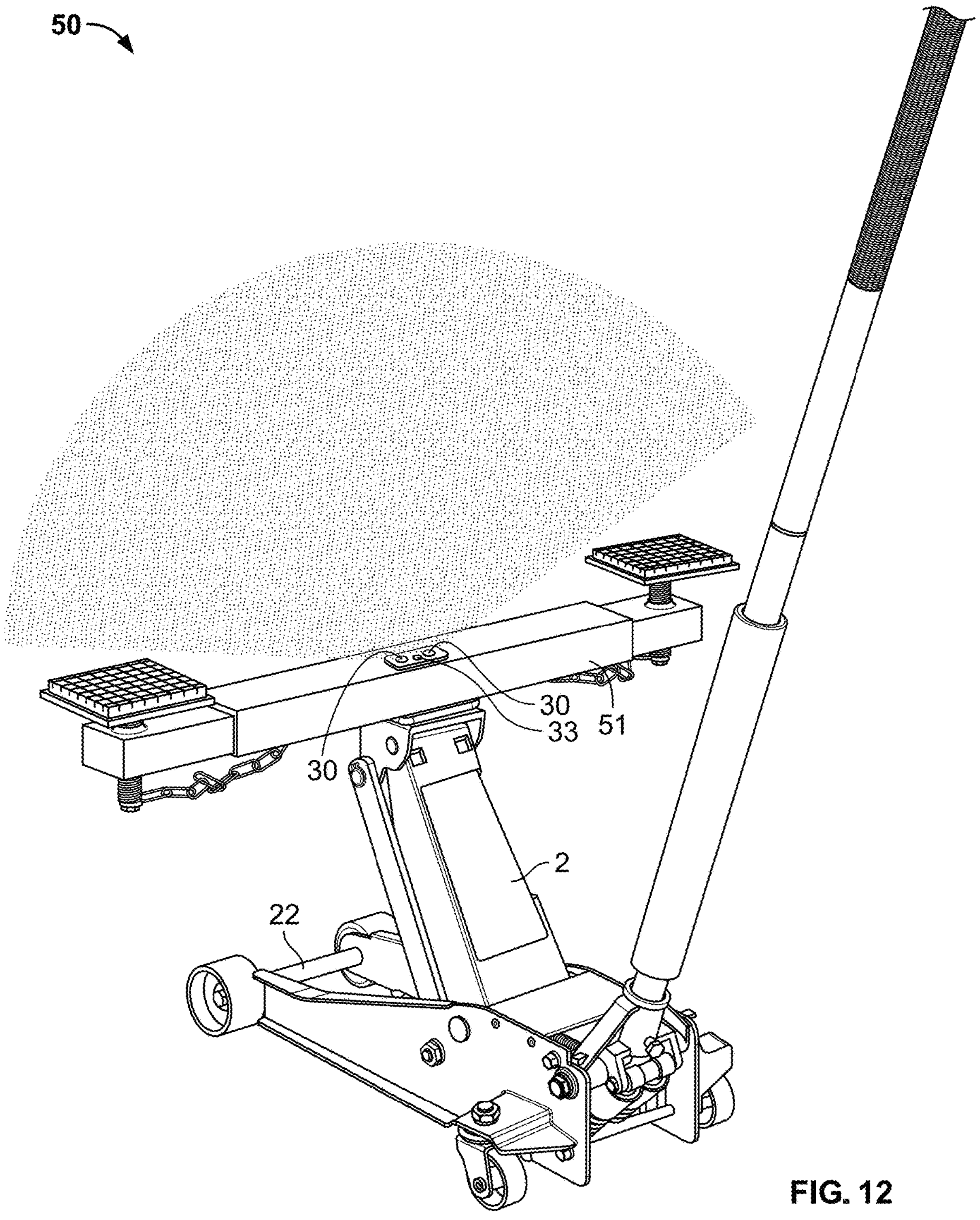
FIG. 12 illustrates a perspective view of a bridge jack including a combination lighting element and camera element integrated into a bridge, according to one aspect of the present disclosure.

FIG. 12 shows an alternative embodiment of the combination lighting element 30 and camera 33 used in conjunction with a bridge jack 50. The lighting element 30 may be one or more LEDs and function as described above. Likewise, the camera 33 may function similarly to the embodiment(s) described with respect to FIGS. 8 and 9. The camera 33 used in the present embodiment, uses a wide-angle or fish-eye lens such that the camera's field of view 35 (see FIG. 10) is wide enough to capture the relevant work and multiple lifting points on the underbody of the vehicle. The camera 33 may be located in between two lighting elements 30. The camera 33 and the lighting elements 30 are substantially located at a midpoint of a bridge 51. In alternative embodiments, the camera 33 and the lighting elements 30 may be located in different locations on the bridge 51 or on the bridge jack 50. The bridge jack 50 may also incorporate the lighting elements 30 previously disclosed. For example, the bridge jack 50 may include the combination lighting element 30 and camera 33 located on the bridge 51, in addition to the lighting element located on the front axle 22 and/or the lifting arm 2.

Figure 13:
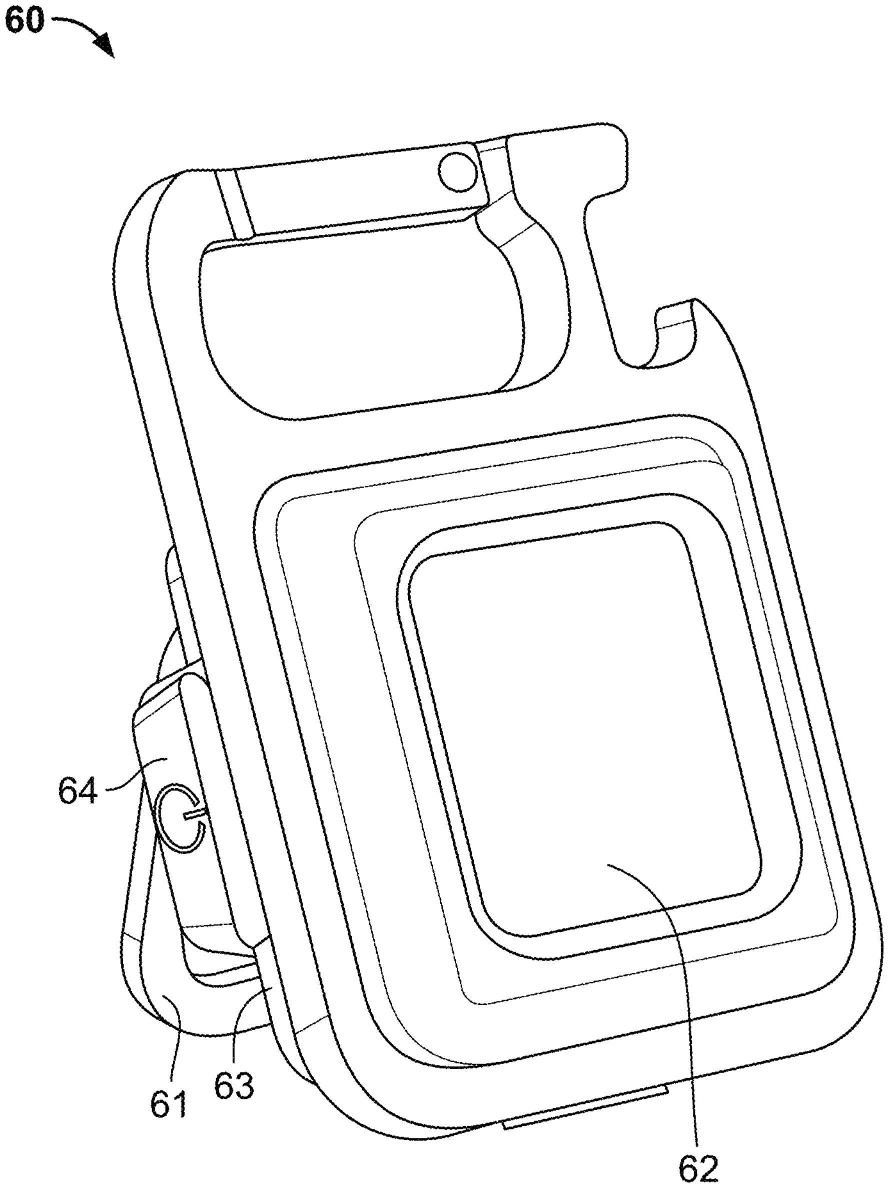
FIG. 13 illustrates a removable lighting element including a clamp for attaching the removable lighting element to a floor jack, according to one aspect of the present disclosure.

FIG. 13 shows a removable lighting element 60. The illustrated example includes a clamp 61, an LED light panel 62, and an integrated battery 63. The battery 63 may be disposable or rechargeable as described in more detail above. The removable lighting element 60 also includes a switch 64 for turning the lighting element 60 on/off and/or switching between different illumination modes. The removable lighting element 60 may have different illumination modes that differ in brightness level. The lighting element 60 may be clamped to the lifting arm 2, handle 5 (see FIG. 1), or any other suitable portion of the floor jack 1 to illuminate the work area. The removable lighting element 60 may also be controlled remotely by the user. The removable lighting element 60 may be used in addition to the lighting elements 30 disclosed previously.

Figure 14:
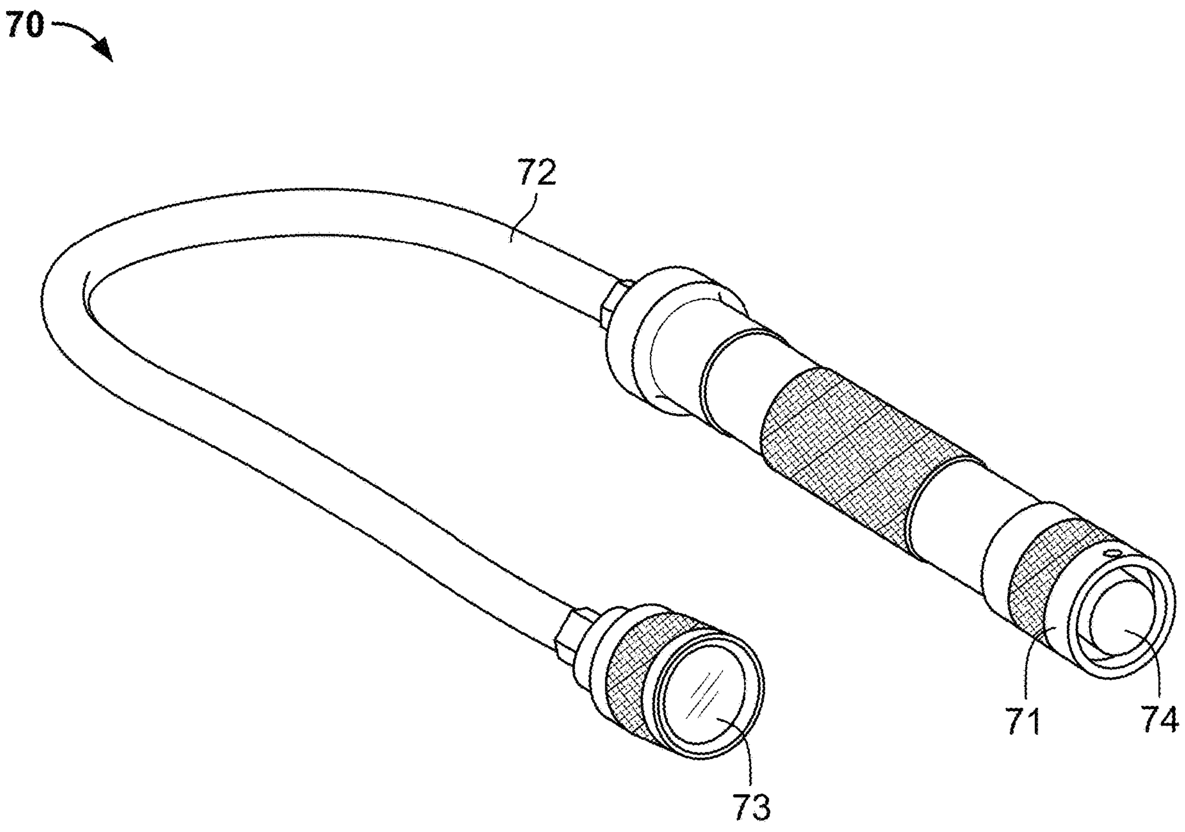
FIG. 14 illustrates a flexible lighting element, which is attachable to a floor jack, according to one aspect of the present disclosure.

FIG. 14 shows another removable lighting element, the flexible lighting element 70. The flexible lighting element 70 includes a base 71, including a battery (not shown), coupled to a flexible arm 72 with an LED (not shown) and protective lens 73. The battery may be disposable or rechargeable as described in more detail above. The flexible lighting element 70 also includes a switch 74 for turning the lighting element 70 on/off and/or switching between different illumination modes. The flexible lighting element 70 may have different illumination modes that differ in brightness level. The flexible lighting element 70 may be attached to the floor jack 1 via an adhesive bottom, Velcro, suction, bracket assembly, clamp, magnet, or any combination thereof. The flexible arm 72 enables the user to manipulate the direction of the lens 73 to emit light to better illuminate the floor jack 1, the lift point(s), or targeted work area. The flexible lighting element 70 may also optionally include the camera 33 as described above.

In one embodiment, the flexible lighting element 70 may be affixed to any part of the floor jack 1 by using the support element 32 (e.g., a bracket). For example, the flexible lighting element 70 may be affixed to a portion the floor jack 1, such as the body 3, using the support element 32, see FIG. 9. Once affixed to the floor jack 1, an operator is able to adjust the direction of the light beam 31 by bending the flexible arm 72. Additionally, the direction of the light beam 31 of the lighting element 70 is maintained and/or adjusted independent of the lifting arm 2 angle/position.

It is understood that all of the above-described lighting element embodiments may be battery powered or may be hardwired to a power source. Further, the lighting element may project white light or may be configured to project other colors (e.g., red, green, blue, etc.). In such an embodiment, the lighting element includes a switch to enable the user to selectively change the brightness and/or warmth or color of the light. It is further understood, that, the lighting element may be configured to project any color or series of colors of light on the visible spectrum. Additionally, the lighting element may include UV light to detect leaks.

The present disclosure is described in such full, clear, concise, and exact terms as to enable any person skilled in the art to which it pertains to practice the same. It is to be understood that the foregoing described preferred aspects of the disclosure and that modification may be made therein without departing from the spirit of scope of the disclosure as set forth in the appended claims. The scope of the disclosure is to be accorded the broadest interpretation to encompass all such modifications and equivalent structures and functions. Therefore, it is intended that the application not be limited to the particular aspects illustrated or described, but that the application will include all aspects falling within the scope of the general disclosure.

What is claimed is:

1. A lighting system for a floor jack comprising:

at least one camera element and a communication circuit, wherein the camera element is operable to record at least one video image and the communication circuit is operable to transmit the video images to an electronic device;

at least one lighting element operable to emit a light beam;

a battery electrically coupled to the lighting element and operable to power the lighting element; and a switch electrically coupled to the battery and operable between a first position and a second position, wherein the light beam is adjustable.

2. The lighting system of claim 1, wherein the lighting element is coupled to a lifting arm of the floor jack.

3. The lighting system of claim 2, wherein the lighting element comprises a housing associated with the lifting arm, wherein the housing includes a lens and at least one light-emitting diode (LED) light within the housing.

4. The lighting system of claim 3, wherein the lighting element projects the light beam towards at least an end of the lifting arm.

5. The lighting system of claim 1, wherein the lighting element is removable, wherein the lighting element may be coupled to the floor jack at a plurality of locations.

6. A floor jack comprising:

a body;

a lift arm pivotably coupled to the body;

a first lighting element operable to emit a first light beam towards a portion of the floor jack;

a second lighting element operable to emit a second light beam towards a portion of the floor jack:

a battery electrically coupled to the at least one of the first lighting element or the second lighting element operable to power at least one of the first lighting element of the second lighting element, a bridge coupled to the body lift arm operable to move between an upper extended position and a lower retracted position:

wherein the first lighting element is coupled to the floor jack at a first location and the second lighting element is coupled to the floor jack at a second location, and the first location is different than the second location:

wherein one of either the first lighting element of the second lighting element is coupled to the bridge; and a switch electrically coupled to the battery and operable between a first position and a second position, wherein at least one of the first light beam orand the second light beam are adjustable.

7. The floor jack of claim 6, wherein the at least one lighting element comprises a housing coupled to a portion of the floor jack, wherein the housing includes a lens and least one light-emitting diode (LED) light within the housing.

8. The floor jack of claim 6, wherein one of either the first lighting element or the second lighting element is coupled to the body proximate a front axle.

9. The floor jack of claim 6, wherein one of either the first lighting element or the second lighting element is coupled to the lifting arm.

10. The floor jack of claim 6, wherein one of either the first lighting element or the second lighting element is coupled to at least one saddle-jack saddle, wherein the at least one jack saddle is pivotably coupled to the bridge.

11. The floor jack of claim 8, wherein the one of either the first lighting element or the second lighting element is coupled to a support element coupled to the body.

12. The floor jack of claim 11, wherein the support element is pivotable to adjust the positioning of the light beam.

13. The floor jack of claim 6, wherein the first light beam of the first lighting element overlaps with the second light beam of the second lighting element.

14. The floor jack of claim 10, wherein the first lighting element and the second lighting element are affixed on opposite positions on a circumference of the at least one jack saddle, wherein the at least one jack saddle is pivotably coupled to the lift arm.

15. A floor jack comprising:

a body;

a lifting arm pivotally coupled to the body operable to move between a raised configuration and a lowered position;

at least one lighting element coupled to a portion of the floor jack and operable to emit a light beam towards an end of the lifting arm;

a battery electrically coupled to the lighting element operable to power the lighting element;

at least one camera element integrated with the at least one lighting element and a communication circuit, wherein the camera element is operable to record video images and the communication circuit is operable to transmit the video images to a mobile electronic device; and a switch electrically coupled to the battery and operable between a first position and a second position, wherein the light beam is adjustable.

16. The floor jack of claim 15, wherein the lighting element comprises a housing integrated with the lifting arm, the housing operable to receive at least one light-emitting diode (LED) light.

* * * * *